United States Patent [19]

Mueller et al.

[11] Patent Number: 4,475,241
[45] Date of Patent: Oct. 2, 1984

[54] POLYCARBONATE COATED FILMS

[75] Inventors: Robert L. Mueller; George O. Schroeder, both of Appleton, Wis.

[73] Assignee: American Can Company, Greenwich, Conn.

[21] Appl. No.: 381,580

[22] Filed: May 24, 1982

[51] Int. Cl.³ .................. B65D 30/02; H05B 1/00; B32B 27/36; B05D 3/06
[52] U.S. Cl. ..................... 383/113; 264/22; 264/171; 427/40; 427/41; 428/35; 428/412
[58] Field of Search ............. 229/3.5 R, 55; 264/22, 264/171; 428/412, 35; 383/113; 427/39, 40, 41

[56] References Cited

U.S. PATENT DOCUMENTS

| | | | |
|---|---|---|---|
| Re. 30,856 | 1/1982 | Higley et al. | 264/41 |
| 3,499,820 | 3/1970 | Desaulniers | 229/3.5 R |
| 3,783,089 | 1/1974 | Hurst et al. | 53/39 |
| 4,121,014 | 10/1978 | Shaffer | 428/412 |
| 4,191,790 | 3/1980 | Chung et al. | 428/412 |
| 4,230,769 | 10/1980 | Goossens | 428/412 |
| 4,305,856 | 12/1981 | Sakano et al. | 525/464 |
| 4,327,137 | 4/1982 | Sawa et al. | 428/412 |
| 4,368,231 | 1/1983 | Egert et al. | 428/412 |

Primary Examiner—William R. Dixon, Jr.
Attorney, Agent, or Firm—Stuart S. Bowie; Thomas W. Wilhelm

[57] ABSTRACT

A packaging film is disclosed which comprises a base sheet coated with a polycarbonate coating. The base sheet may be chosen with substantial latitude. The invention also contemplates a process for making the film.

23 Claims, 1 Drawing Figure

POLYCARBONATE COATED FILMS

BACKGROUND OF THE INVENTION

This invention pertains to packaging films, and particularly to films requiring the functionality of a plurality of polymeric materials. In the most readily envisioned application, the films of this invention may be used in the packaging of dry foods such as snacks and the like. Regarding snack foods, the package should functionally serve as a barrier to intrusion of oxygen and moisture. Exclusion of oxygen from the package retards product spoilage. Exclusion of moisture prevents the product from absorbing moisture. Absorption of moisture presents two basic problems. Initially the product loses its crispness, which crispness many consumers identify as a desirable product attribute. Second, the product is more susceptible to spoilage under moist conditions, especially in the presence of oxygen; if the package admits significant quantities of oxygen and moisture combined.

While usually of lessor significance, additional factors do affect the desirability of a given film. Thus, since many snack products contain significant quantities of grease, the packaging film should provide a substantial grease barrier. Without a grease barrier, grease may penetrate through the film so that the user perceives a greasy surface on the exterior of the package. Also, since consumers identify package stiffness with product freshness and quality, a stiffer film is desirable over a functionally equivalent, but less stiff film. The film should resist scratching and scuffing of the surface and have good clarity and gloss. The film should easily accept printed graphics. Finally the film should be readily heat sealable in order to take advantage of the high speed packaging equipment commonly in use.

Currently used snack packages usually rely on cellophane, oriented polypropylene (OPP), or oriented polyester in the package structure. Typical structures include single layer cellophane, double layer cellophane, and cellophane combined with a layer of glassine, OPP or a sealant such as ethylene vinyl acetate (EVA). Another known structure is OPP and a sealant.

The above films do provide certain desirable features. Cellophane is stiff and gives a good freshness perception. OPP provides good moisture barrier and is resistant to flex cracking. Glassine is a low-cost, stiff layer providing excellent opacity.

For oxygen barrier it is known to provide a layer of saran at a convenient layer interface.

While the individual layers provide certain benefits, existing snack films represent a compromise between performance and cost, and construction of a highly acceptable package from these materials could be very expensive. First would be the production of a multiplicity of individual layers, and then lamination of them together to give a highly desirable, but expensive film. A problem with economics is that such layers as OPP and glassine are not readily adapted for in line web production and lamination.

Further to the problems of manufacturing such films, it is highly desirable that the film surface which is predetermined to be on the outside of the package should have good slip characteristics for machining purposes. But slip additives tend to resist adhesion of printing inks which are required for graphics and advertising purposes. For example, a structure of OPP and EVA can be machined easily if a slip agent is incorporated into the OPP layer; however, ink adhesion is poor. Ink adhesion is satisfactory if the slip agent is omitted, but then the film doesn't operate very well on conventional packaging machinery. If the ink is, rather, printed before lamination onto the surface of the OPP which will be laminated to the EVA, then residual ink volatiles may permeate to both the OPP and the EVA film surfaces of the package, risking contamination of the product at the film surface on the EVA side of the film.

Further to cost effective production of the packaging film, it is desirable that all layers of the film be susceptible to economic in-line production and combination.

Finally it is submitted that the surface characteristics of the film are critical not only to functional performance, but also to perceived value in terms of the contained product. Thus such characteristics as gloss, scuff resistance and heat resistance are important in the film surface.

SUMMARY OF THE INVENTION

The inventors have discovered that certain of the foregoing needs are satisfied in a flexible sheet packaging structure which has a base sheet, with the base sheet having two opposing surfaces, at least one of the two surfaces comprising a thermoplastic polymeric composition, and a polycarbonate coating on that one surface. The amount of the coating can be as little as about 2 pounds per 3000 square foot ream up to a maximum of about 20 pounds per ream. The preferred amount of the coating is between about 4 pounds per ream and about 6 pounds per ream.

The base sheet has a preferred characteristic of being relatively impervious to gas and vapor transmission when compared with the gas and vapor transmission rates of the polycarbonate coating. Thus the packaging sheet structure desirably may have printed indica on at least a portion of the one surface of the base sheet, between the polymeric composition and the polycarbonate coating. The imperviousness of the base sheet relative to the polycarbonate coating ensures that residual ink volatile components leave the film by penetration through the coating rather than through the base sheet.

Packages made from the instant sheet structure have the polycarbonate coating toward the exterior of the package, and the base sheet toward the interior of the package; such that volatiles from the inks at the interface of the base sheet and the coating readily exit the film through the coating to the exterior of the package.

While the overall composition of the base sheet is not critical, and while the structure of the base sheet is accorded wide latitude depending on the intended end use of the film, in preferred embodiments for use in snack packaging, the composition of the material comprising the one surface of the base sheet adjacent the polycarbonate coating is chosen from the group consisting of polypropylene hompolymers and copolymers, polyethylene, cellophane, polyester, nylon, ethylene vinyl acetate and ethylene vinyl alcohol.

A process for making packaging film structures of this invention includes: extruding and solidifying a polymeric base sheet; treating one surface of the base sheet with an electrical discharge; coating that one surface of the base sheet with a primer; drying and curing the primer; and extrusion coating the primed base sheet surface with a polycarbonate coating. In some cases, the process is performed with all the recited steps being part of one continuous operation. Where the printing of graphics on the film is desired, the operation is typically interrupted after the electrical discharge treatment, and the printing is done before applying the primer coating. The balance of the process then follows as recited before.

For best adhesion of both the inks and the polycarbonate coating, the treatment should produce a minimum surface energy level of about 42 dynes per centimeter.

The preferred primer to effect excellent adhesion is a solvent based polyester.

In a most preferred structure, the base sheet is formed by a coextrusion process, the treatment produces surface energy of at least 42 dynes per centimeter, the primer is a solvent based polyester, and the polycarbonate coating is about 4 to 6 pounds per 3000 square foot ream.

The coated films of this invention are desirably used in making closed and sealed pouch-type packages on conventional equipment, such as vertical form, fill and seal equipment. In such processes, the polycarbonate coating is disposed on the exterior surface of the package on the exteriorly-disposed surface of the base sheet. The interior surface of the package is the interiorly-disposed surface of the base sheet, and is desirably composed of a heat sealable polymer layer. Thus the package may be sealed closed by heat seals between facing portions of the interior surface of the package, which is the interior surface of the base sheet.

BRIEF DESCRIPTION OF THE DRAWING

The drawing is a cross-section of a film of this invention.

DETAILED DESCRIPTION OF THE INVENTION

Figure 1:
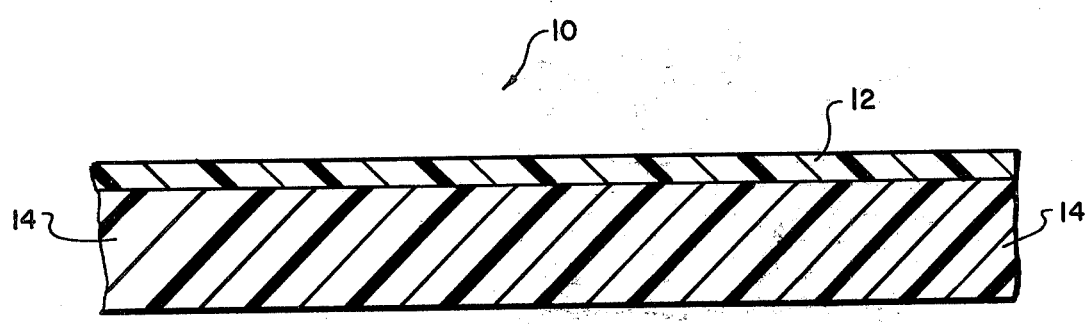

Referring now to the drawing, the invention is a flexible film 10 having a base sheet 14 and a coating 12 of polycarbonate based polymer. Preferred polycarbonates are homopolymers sold by General Electric as Lexan and by Mobay Chemical as Merlon. It is anticipated that certain polycarbonate copolymers may also be useful to this invention.

The practical coating weight is between about 2 pounds per 3000 square foot ream and about 21 pounds per ream. The lower limit is controlled by process limitation, as it is extremely difficult to apply the coating at rates of less than 2 pounds per ream, with uniformity of the coating declining rapidly as the coating weight is reduced below that level. Above about 21 pounds per ream, the polycarbonate acts functionally more like an individual layer than a coating. Also, the cost of heavier thicknesses of polycarbonate would render the film too expensive, and no longer cost competitive.

The preferred range of coating weights is between about 4 pounds per ream and about 6 pounds per ream. At weights under 4 pounds per ream, the processing does become more difficult, though not prohibitively so. At between 4 and 6 pounds per ream, the coating provides the optimum balance of properties available from the polycarbonate coating at an economical cost.

The advantages of the polycarbonate coating in a packaging film are available on a substantial variety of base sheets, so long as the coating is well adhered to the base sheet. The coating may be well adhered to base sheets having, as the surface layer to be coated, a polymeric layer. Preferred polymers for the surface layer of the base sheet to be coated are polypropylene homopolymers and copolymers, polyethylene, cellophane, polyester, nylon, ethylene vinyl acetate and ethylene vinyl alcohol. Other layers of the base sheet, if used, may be any of a variety of materials which may be selected for their desired function independently of the polycarbonate coating. There may be a synergistic affect between the coating and certain layers of the base sheet, while such synergism is not necessarily critical to the invention. Thus, the other layers may or may not be polymeric, and may advantageously include, for example, metal foil or paper. The formation of base sheets having metal foil or paper, of course, requires process operations other than extrusion, such as laminating by known techniques.

Depending on the functional needs of the end product, the base sheet may be very simple such as a 2-layer structure of OPP and a heat sealable layer or cellophane and a heat sealable layer. Typical heat sealable layers are comprised of EVA or surlyn. Or the base sheet may be complex to provide other functional properties to the sheet structure. Clearly, existing film structures, such as those iterated above for snack packaging are improved by the addition of a polycarbonate coating. Specific examples of films of this invention are:

PC/Cello
PC/Cello/EVA
PC/Cello/Cello
PC/OPP/Cello
PC/OPP/EVA
PC/Mylar/EVA
PC/HDPE/HDPE/EVA
PC/HDPE/HDPE/Plexar/EVOH/Plexar/Surlyn
PC/Nylon/Plexar/Surlyn
PC/Nylon/EVOH/Nylon/CXA/Surlyn
PC/Nylon/EVOH/Nylon/CXA/HDPE/CXA/Surlyn
PC/Nylon/EVOH/Nylon/CXA/LLDPE/CXA/Surlyn
PC/Nylon/Nylon/Nylon/CXA/LLDPE/CXA/Surlyn
PC/Nylon/Nylon/Nylon/CXA/HDPE/CXA/EVA PC=polycarbonate
Cello=cellophane
Mylar=oriented polyester
HDPE=high density polyethylene
Plexar=polymeric adhesive tie layer
EVOH=ethylene vinyl alcohol
CXA=polymeric adhesive tie layer
LLDPE=Linear low density polyethylene The above listing is illustrative only, and it should not be construed as limiting the scope of the invention.

EXAMPLE 1

In forming the coated packaging sheet material of the invention, the base sheet is preferrably formed first. The preferred method of forming the base sheet is by coextrusion. As a first example, a simple coextrusion is HDPE/HDPE/EVA. After formation of the base sheet, the surface predetermined to be coated is treated with an electrical discharge such as a corona treatment. The treatment level is preferably at least 42 dynes per centimeter to ensure good wettability of the surface by the primer which is carried in a liquid solvent. Treatment level is adjusted to ensure good wetting, as this is critical to good adhesion of the final coating. Thus, while 42 dynes is recited as preferred, skilled artisans will adjust the level to achieve good wetting by their primers. After treatment, the treated surface is then primed. In the above recited structure, where HDPE is to be coated, the preferred primer is sold by Polymer Industries, Division of Phillip Morris Company as LAMAL, and is a solvent type polyester. It is solution coated, dried, and cured. The base sheet is then ready to receive the polycarbonate coating.

The polycarbonate coating is applied by conventional extrusion coating techniques. In a typical process, the polycarbonate exits the die at 575°–620° F.

While the LAMAL primer is illustrated, the type of primer is not critical to the invention. What is critical is that the polycarbonate coating be affixed with good adhesion to the base sheet. The treatment level and choice of primer are thus cooperating variables which can be adjusted relative to each other and to the base sheet to achieve good adhesion. Similarly, the method of applying the primer will depend upon the primer selected, as methods of applying commerically available primers are provided by the suppliers of the primer. Thus the treatment level and primer recited are not limiting, but rather are illustrative of means of achieving the functional properties desired.

EXAMPLE 2

As a second example, a more complex coated film is made by coextruding a 2 mil film of Nylon/EVOH/Nylon/CXA/Surlyn as the base sheet. The nylon surface layer is then corona treated and primed with the LAMAL primer. Finally, the treated and primed nylon surface is extrusion coated with 4 pounds per ream of polycarbonate.

The resulting film is glossy, and abuse resistant. The film is stiff and crisp. The film is used to package corn chips on conventional snack packaging equipment. The resulting package has good seal strength and excellent barrier properties.

In any of the films of this invention, the film may conveniently be surface printed before applying the coating. The coating then protects the printing from scuffing abrasion, and the like. Also the coating may contain additives such as antiblock, and slip additives without reducing the ease of printing, since the printing is applied to the base sheet before application of the coating. Because printing can be deposited on the surface of a layer in the interior of the film, film surface characteristics can thus be built into the coating without special concern for ink adhesion. Similarly, volatization of residual ink components does not contaminate product in packages made from sheet material of the invention, since polycarbonate is permeable to most vapors and gases, and will readily conduct the evolved vapors to the outside of the package and away from the product. The Example 2 film machined well, and formed good heat seals, without sticking to the equipment, at seal bar temperatures as high as 270° F., with dwell time of about 1 second at 40 pounds per square inch pressure.

While the invention has been described in terms of its utility for packaging dry foods, other products which may or may not be dry, or may or may not be foods, may likewise be packaged in films of the invention. Those skilled in the art can easily adopt the polycarbonate coatings taught herein to base sheets appropriate to the needs of the product to be packaged.

We claim:
1. A flexible packaging sheet structure, comprising:
  (a) a base sheet, said base sheet having two opposing surfaces, one of said surfaces comprising a thermoplastic polymeric composition;
  (b) a primer on said one surface;
  (c) a polycarbonate coating on said primer, said primer being disposed between said base sheet and said polycarbonate coating; and
  (d) a heat sealable material on the other said surface of said base sheet.

2. A flexible packaging sheet structure as in claim 1 and wherein said base sheet includes at least one layer of paper.

3. A packaging sheet structure as in claim 1 wherein the amount of said coating is between about 4 pounds per ream and about 6 pounds per ream.

4. A packaging sheet structure as in claim 1 or 3 wherein said base sheet is relatively impervious to gas and vapor transmission when compared with gas and vapor transmission rates of said polycarbonate coating.

5. A packaging sheet structure as in claim 4 and including printed indicia on at least a portion of said one surface of said base sheet, and between said polymeric composition and said polycarbonate coating.

6. A packaging sheet structure as in claim 4 wherein the composition of the material comprising said one surface is chosen from the group consisting of polypropylene homopolymers and copolymers, polyethylene, cellophane, polyester, nylon, ethylene vinyl acetate and ethylene vinyl alcohol.

7. A flexible packaging sheet structure as in claim 1 and wherein said base sheet includes at least one layer of metal foil.

8. A package, said package comprising: sidewalls, said sidewalls being constructed of a flexible film, said film comprising a base sheet having two opposing surfaces, one said surface of said base sheet being disposed toward the exterior of the package, said one surface having a primer thereon; a polycarbonate coating on said primer, said primer being disposed between said base sheet and said polycarbonate coating; the other said surface of said base sheet being disposed toward the interior of said package and having a heat sealable material thereon, said package having been fabricated with the formation of heat seals between facing elements of said film on the interior surfaces of said package.

9. A process for making a packaging film structure, comprising:
  (a) extruding and solidifying a polymeric base sheet;
  (b) treating one surface of said base sheet with electrical discharge;
  (c) printing indicia on said one surface of said base sheet;
  (d) coating said one surface of said base sheet with a primer;
  (e) drying and curing said primer; and
  (f) extrusion coating said one surface of said base sheet with a polycarbonate coating.

10. A process as in claim 9 wherein said treatment produces a surface energy level of at least 42 dynes per centimeter.

11. A process as in claim 10 wherein said primer is a solvent based polyester.

12. A process as in claim 9, 10, or 11 wherein said polycarbonate coating is between about 4 pounds per ream and about 6 pounds per ream.

13. A process as in claim 9, 10, or 11 wherein said extruding comprises coextrusion of a plurality of layers of polymeric material, said plurality of layers comprising said base sheet.

14. A process as in claim 13 wherein said polycarbonate coating is between about 4 pounds per ream and about 6 pounds per ream.

15. A process for making a packaging film structure, comprising:
(a) extruding and solidifying a polymeric base sheet;
(b) treating one surface of said base sheet with electrical discharge;
(c) coating said one surface of said base sheet with a primer;
(d) drying and curing said primer; and
(e) extrusion coating said one surface of said base sheet with a polycarbonate coating.

16. A process as in claim 15 wherein all the recited steps are performed as part of one continuous operation.

17. A process for making a packaging film structure, comprising:
(a) forming a base sheet having two opposing surfaces, one of said surfaces comprising a thermoplastic polymeric composition;
(b) treating said one surface of said base sheet with electrical discharge;
(c) printing indicia on said one surface of said base sheet;
(d) applying a primer to said one surface of said base sheet; and
(e) extrusion coating said one surface of said base sheet with a polycarbonate coating.

18. A process as in claim 17 wherein said treatment produces a surface energy level of at least 42 dynes per centimeter.

19. A process as in claim 18 wherein said primer is a solvent based polyester.

20. A process as in claim 18 wherein said polycarbonate coating is between about 4 pounds per ream and about 6 pounds per ream.

21. A process for making a packaging film structure, comprising:
(a) forming a base sheet having two opposing surfaces, one of said surfaces comprising a thermoplastic polymeric composition;
(b) treating said one surface of said base sheet with electrical discharge;
(c) applying a primer to said one surface of said base sheet; and
(d) extrusion coating said one surface of said base sheet with a polycarbonate coating.

22. A process as in claim 21 wherein all the recited steps are performed as part of one continuous operation.

23. A process as in claim 21 wherein said polycarbonate coating is between about 4 pounds per ream and about 6 pounds per ream.

* * * * *